Jan. 4, 1949.   W. H. GREEN ET AL   2,458,261
PROCESS AND APPARATUS FOR EFFECTING
CHEMICAL REACTIONS
Filed April 26, 1947   5 Sheets-Sheet 1

INVENTORS
Walter H. Green,
George A. McBride,
BY George A. Hertzing.

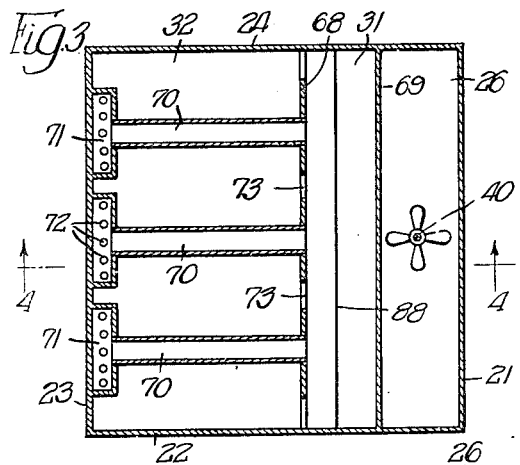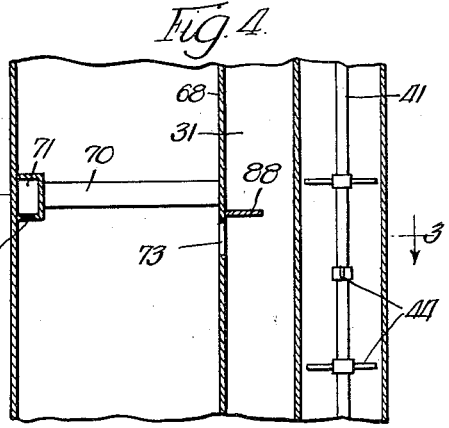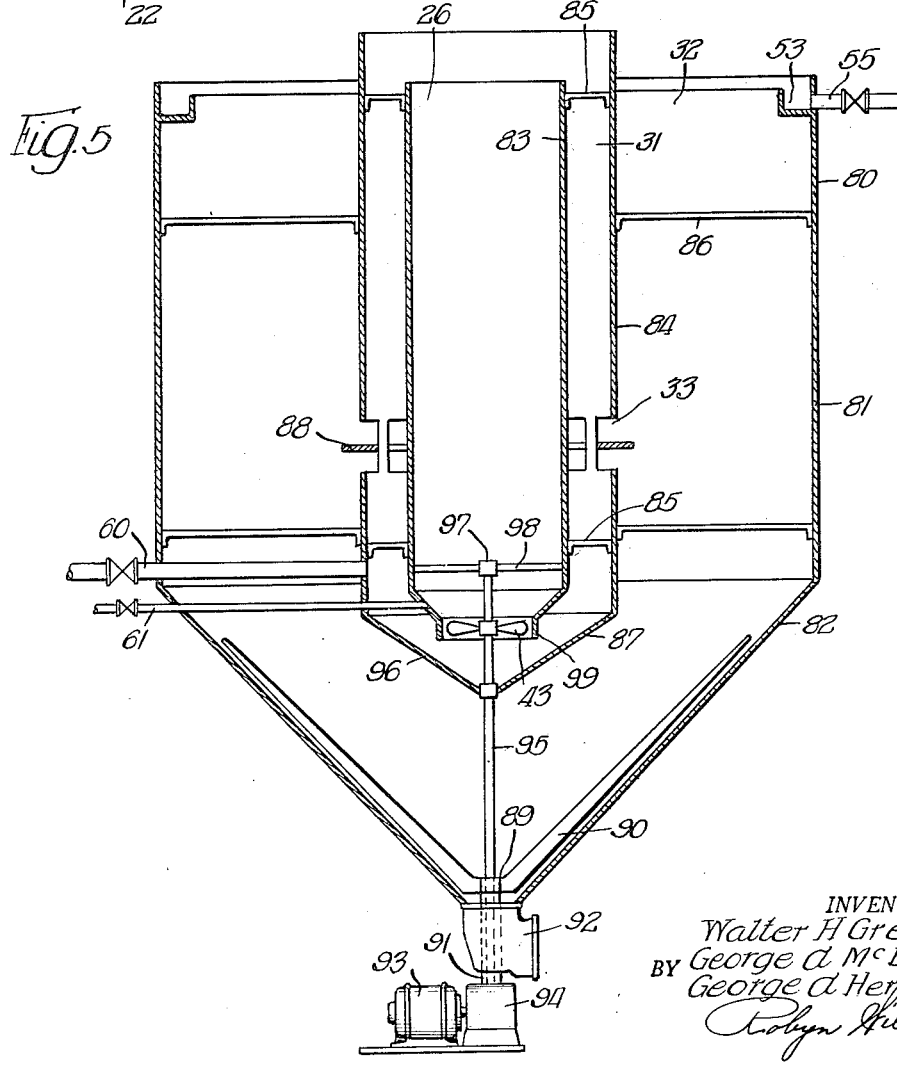

Jan. 4, 1949.  W. H. GREEN ET AL  2,458,261
PROCESS AND APPARATUS FOR EFFECTING
CHEMICAL REACTIONS
Filed April 26, 1947  5 Sheets-Sheet 3
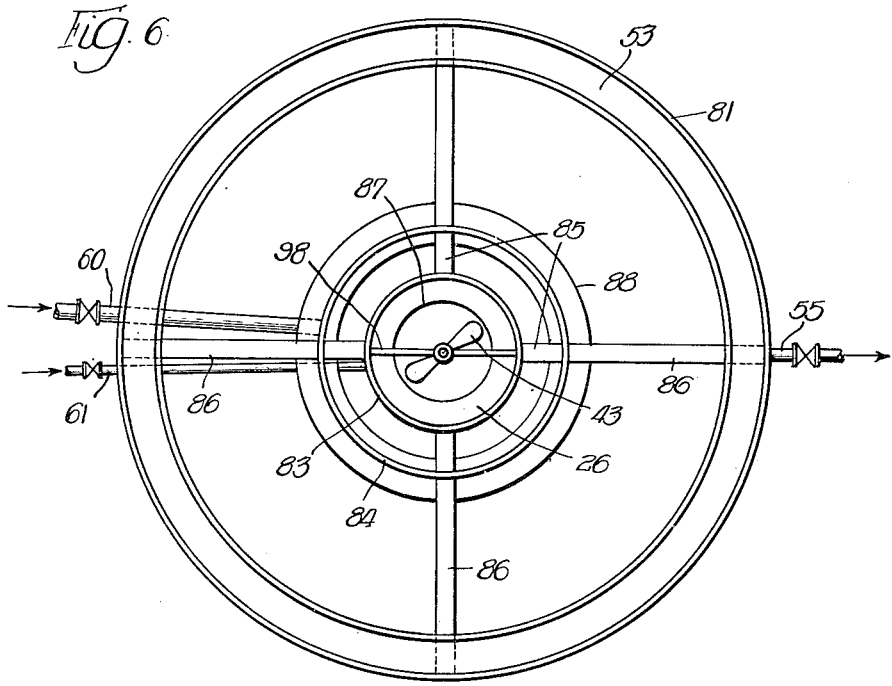
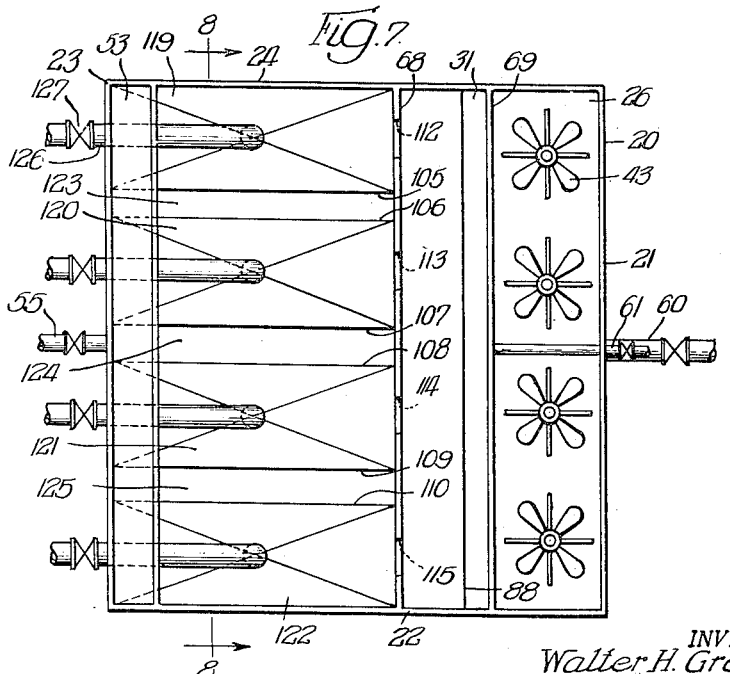
INVENTORS.
Walter H. Green,
George A. McBride,
BY George A. Hertzing,
Robyn Wilcox
ATTY.

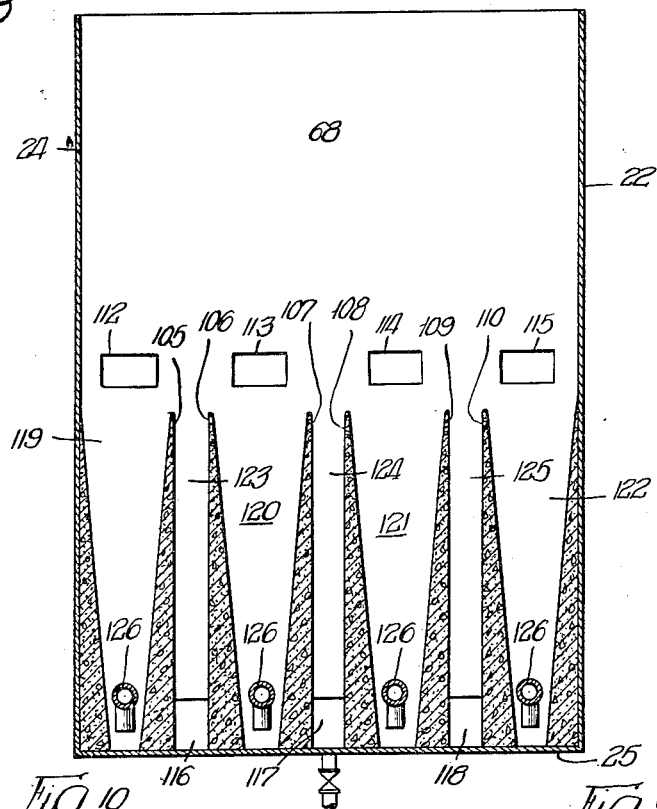
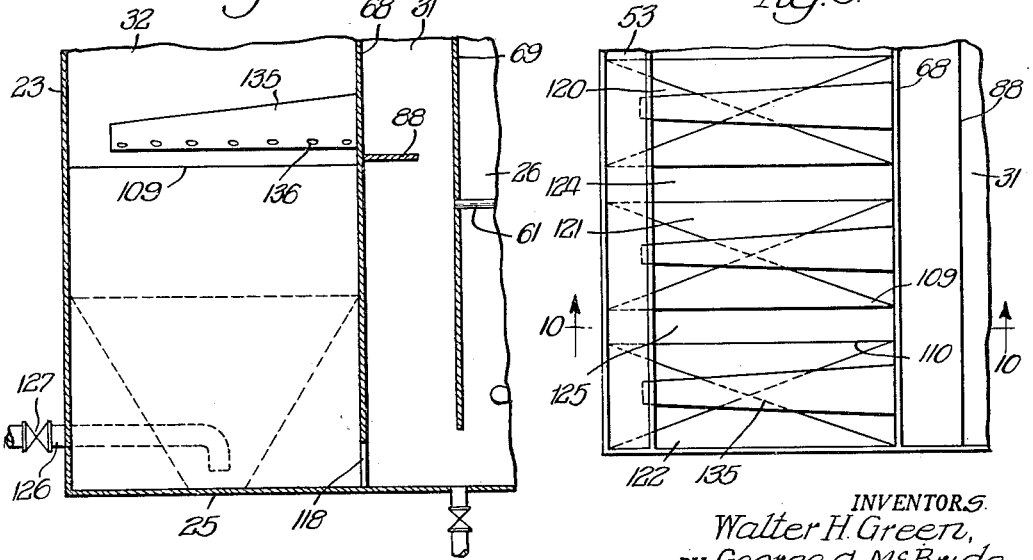

INVENTORS
Walter H. Green,
George A. McBride,
George A. Hertwig,
BY

Patented Jan. 4, 1949

2,458,261

UNITED STATES PATENT OFFICE 2,458,261

PROCESS AND APPARATUS FOR EFFECTING CHEMICAL REACTIONS

Walter H. Green, Geneva Township, Kane County, Ill., George A. McBride, Grosse Pointe, Mich., and George A. Hertzing, Los Angeles, Calif., assignors to Infilco Incorporated, Chicago, Ill., a corporation of Delaware Application April 26, 1947, Serial No. 744,200

20 Claims. (Cl. 23—201)

This invention relates to a process and apparatus for effecting chemical reactions and has particular reference to the formation of relatively insoluble precipitates from strong solutions, such as in the formation of magnesium hydroxide from brine or the precipitation of impurities in the purification of sugar solutions, and the like, and the separation of the resultant precipitate, this application being a continuation-in-part of our copending application, Serial No. 457,100, now abandoned.

In general our invention is directed to the formation of a relatively insoluble precipitate from strong solutions, i. e. solutions of such strength that normally the precipitate formed would be so fine as to be separated from the liquid with difficulty. When we speak of "relatively insoluble precipitate," or "substantially insoluble precipitate," we mean those substances which have a solubility of less than about one part of solute to one thousand parts of solvent. These substances are sometimes referred to as "very slightly soluble" and "insoluble" (e. g. Hackh's Chemical Dictionary). Our invention is directed to the formation of such relatively insoluble precipitates from such strong solutions in a manner to provide particles of coarse size and increased density, so that the precipitate and the liquid can be more readily separated, one from another.

One important object of our invention is an improved process and apparatus for preparing magnesium hydroxide from brines, such as sea water.

A further object of our invention is the rapid preparation of magnesium hydroxide from brines, with the formation of solid particles which are readily filterable.

Another important object of our invention is an improved process and apparatus for purifying sugar solutions.

One of the objects of our invention is a rapid and complete purification of sugar juice wherein the raw juice is dosed with a precipitate forming reagent and clarified in a single apparatus and as a single process, and whereby the impurities are removed as "mud' which is easily filtered.

Another object of our invention is the purification of sugar juice by a "hot lime" process, wherein the juice is first heated, and then dosed with a precipitant and clarified, whereby a clear and pure juice is secured and impurities are removed in the form of a dense sludge which readily separates from the juice.

One of the aspects of our invention lies in the formation of relatively insoluble precipitates from reacting strong solutions, which precipitates are characterized by coarse particles of considerable density and a concomitant continuous classification of coarser and finer particles with removal of the former and retention of the latter for further growth, whereby a more filterable and otherwise favorable product is obtained.

This invention relates to the treatment of relatively strong solutions under conditions such that there is formed a relatively insoluble precipitate, following which the liquid and precipitate are separated, and is directed to an improved process for carrying out such treatment, and an improved apparatus therefor.

This improved process is very advantageous where the solution is concentrated with respect to the material to be precipitated, so that there normally tends to be formed a very considerable volume or amount of fine precipitate. It is also particularly advantageous in having the effect of securing the precipitate in a relatively dense or heavy form, and where the substance precipitated is of crystallizable nature, our improved process results or aids in the production of crystals of larger size.

Another object is to provide conditions under which the precipitation will be as from dilute solution—even though the solution to be treated is quite concentrated when received for treatment.

These and other objects of the invention will be apparent from the specification and claims which follow.

In some manufacturing processes, solutions are present which contain a considerable amount of impurities, and when these are precipitated the resulting sludge is very voluminous and difficult to handle, and tends to include and carry with it a considerable portion of the solution itself. In such cases where the value lies in the solution, this sludge must be washed to recover the values and with many such sludges this is difficult because of the amount and nature of the sludge. We have found that by carrying out the treatment or precipitation in accordance with our present invention, the sludge formed is smaller in volume, denser, and of more filterable nature than heretofore secured, so that on the one hand there is less of the solution included therein, and on the other it is more readily washed to recover the solution. As an example of a process in which the value lies in such a solution there may be mentioned the purification of sugar juice, such as that from sugar cane, by treatment, for instance, with lime. In such treatment, the sludge normally formed in respect to the juice in which it is precipitated, is very voluminous, is very light and settles slowly, and is difficult to filter. We have found that by carrying out the treatment of sugar juices in accordance with our process, not only is the sludge obtained more dense and filterable, but also clarification of the sugar juices is much more rapid. Thus we have found it possible to clarify sugar juice at rates up to 1½ to 2 gallons per square foot per minute, as against the ordinary rate of ¼ to ½ gallon per square foot per minute. Not only do we obtain such advantages, but in this case the treated sugar juice or solution is in better condition for crystallization as it is lighter in color and of higher purity than that secured by the usual lime treatment of sugar juice.

In other cares the value lies in the precipitate to be obtained, and the liquid separated from the precipitate may go to waste, or it may contain values such that it is, after clarification, transferred to some other step for recovery or use of such values. We have found that by carrying out the treatment in accordance with our process, there is in such cases a direct gain due to the nature of the precipitate obtained. As an illustration of this may be cited the precipitation of magnesium hydrate from solutions of magnesium salts such as those containing magnesium chloride, or sulphate, or both. We have found that in carrying out precipitation of magnesium hydrate from brines or sea water, the product can be obtained in very dense particle form, so that the volume of precipitate to be handled is much smaller and separation of the remaining bring therefrom by filtration is much more rapidly and easily accomplished. Furthermore, due to its coarse and permeable nature, a thicker layer of magnesium hydrate can be obtained on the filter, which facilitates washing thereof and enables equal quantity output with substantially smaller filtration facilities. Another object of our invention is thus directed to providing a precipitate in the form of crystals of large size, so as to facilitate further handling of the same.

One important feature of our invention lies in the fact that we so construct our apparatus and carry out the treatment that the precipitation takes place in or from a dilute solution of a desired favorable strength even though the solution as delivered for treatment is strong or concentrated. To carry out this feature we retain in the apparatus and in the process a quantity of solution that has already been treated and from which precipitation has already taken place, so that the solution has become "barren" at least insofar as the particular solute is concerned, and we mingle the incoming strong solution with this retained solution, so as to provide a solution that is weak or dilute with respect to the material which is to be precipitated, and then subject this dilute solution to the desired treatment. We have found also that in many cases the same, or substantially the same, effect can be had if instead of diluting the entering solution with a volume of the barren solution, so that the entering liquid is itself considerably diluted before admixture with the reagent, the precipitating reagent is mixed in and diluted with the required volume of the already treated and retained solution and the newly entering solution then combined with the diluted reagent.

In a general way the effect is the same whichever way the dilution is made, the important thing being that the conditions established be such that reaction and precipitation occur as in and from dilute solution, or that the reaction and following precipitate formation be diffused and delayed. In individual cases there may be a preference for first diluting the entering solution and then mixing this with a stronger reagent solution, or diluting the reagent solution with treated liquid and then mixing this with the stronger, newly entering solution. Such preference may arise out of the nature or the strength of the solution to be treated or of the nature of the reagent, or out of the nature of the relatively insoluble precipitate to be formed, or other such conditions as are known or may be determined by experiment in individual cases; but in all such cases the general principle employed remains the same. It is to be understood also that the degree of dilution will vary from case to case depending on various factors such as the nature of the precipitate forming, the strength of the original solution, and the like. We have utilized dilution of as little as two or three times and as high as several hundred times the volume of original solution. While pure water or other solvent could be used as a diluting medium and so the advantages of our invention realized in part, this would be accompanied by a corresponding loss of precipitate to the extent this is soluble in the added liquid, and by other disadvantages depending upon the particular set of conditions, and thus one of the purposes of our invention is to avoid such losses by using as a diluent the already treated liquid or liquid undergoing treatment.

While this dilution is one feature of our process by which conditions more favorable to a precipitating reaction or to the nature of the precipitate formed are obtained, our invention comprises other features, as we contemplate also that the dilution shall occur and reactions take place in a volume of solution that is in continuous circulation and agitation, and we retain in this solution where precipitation is taking place a substantial quantity of the precipitate that has already been formed. It is already known that when a substance is precipitated in the presence of previous crystals of the same substance, the old crystals tend to grow to a larger size, so that they become heavier and more readily separated. We have found, however, that something of the same kind of thing occurs in our process, when the substances separated out are of gelatinous or collodial nature. Whether this is due only to the precipitation taking place from dilute solution or whether it is due to the continuous and considerable agitation and circulation we provide over a considerable period, or to a combination of both, is not yet clear to us, but we have found a decided advantage in reacting solutions as herein described. What appears to happen is that due to the dilution and the vigorous agitation and circulation, there is a tendency to dewatering and shrinkage of the amorphous particles already present and that new precipitate as formed deposits on and spreads out over the surface of the older particles as a thin layer which, in turn, may readily dewater and become denser. Retention also has some part in this for it is to be kept in mind that the time of retention of both the solution and the precipitate in the process is a more or less direct function of the degree of dilution.

Our invention contemplates, however, not only the features already spoken of, but also that in or during the steps referred to there shall be a continuous classification of the particles of precipitate formed under conditions such that the heavier particles will separate from flowing liquid, as in a classification chamber or zone, while the lighter particles will be returned to, or left in, and subjected to the circulation and reaction previously spoken of, so that these lighter particles may be subject to further treatment and accretion. In this way there is obtained a discharge or underflow containing in general the larger or heavier particles, with advantages as pointed out above.

Briefly, when considered as a process, our invention comprises the steps of retaining in the treating system a volume of already treated solution in amount bearing a predetermined ratio to the rate of entry of new solution, maintaining a circulation of said retained solution through a cyclic path, delivering new solution and precipitating reagent into the circulating solution, preferably at different points in the path of circulation whereby at least one of the introduced materials will be mixed with and diluted by the already treated solution before contacting and reacting with the other material, continuously diverting a predetermined portion of the circulating mixture substantially in excess of the rate of entry of new solution into and across a horizontal classification zone at a velocity sufficiently low to permit larger and heavier particles formed as a result of the precipitating action to deposit therefrom, and sufficiently high to retain smaller and lighter particles in suspension, withdrawing said heavier and larger particles from below said diverted flow, withdrawing a portion of said flow as barren solvent from above said diverted flow, and returning the remaining part of said diverted flow carrying smaller and lighter particles into the circulating flow, whereby the returned liquid again acts as diluent and the smaller and lighter particles can grow in size.

Our invention comprises also apparatus in which the process referred to above may be carried out. Such apparatus may vary considerably in dimension and in the proportion of its various parts, depending upon the particular conditions to be met and it may also vary somewhat in form of the various parts and of the whole, although certain essential features will be retained, as will be poined out more in detail hereafter.

Briefly, when considered as an apparatus, our invention comprises a tank, a partition in said tank dividing the same into a dilution and reaction chamber and a solids removal chamber, a power driven liquid impeller in the dilution and reaction chamber positioned to discharge liquid through said chamber, means adapted to pass a flow of liquid from said dilution and reaction chamber across a vertically intermediate portion of the solids removal chamber and for the return of a portion of the liquid in such flow to the dilution and reaction chamber, inlets for delivering solution to be treated and treating reagent into said dilution and reaction chamber, preferably at spaced points therein, an outlet for barren solvent from the upper portion of the solids removal chamber and a solids outlet from the lower portion of the solids removal chamber.

For purposes of illustrating the principles in our apparatus, we will show and describe several forms, although they are essentially the same and operate on the same principle.

It will be obvious that the process and apparatus of the present invention are very flexible and can be economically used over a wide range in the nature and strength of solution to be treated, of reagent employed and of precipitate formed, as illustrated by the reference to its application in such widely divergent fields as the purification of sugar juice and the formation of magnesium hydroxide from brines or sea water. We are sometimes interested in the products of the reaction and their recovery and other times interested in the clarified liquid, but in either event our invention is particularly advantageous for the carrying out of the reaction between the reacting solutions.

Illustrative embodiments of the apparatus of the present invention are shown in the accompanying drawings which form a part of this specification and in which like reference characters in the several figures refer to similar elements.

Figure 3 is a sectional plan view of a modification of the apparatus shown in Figures 1 and 2, taken along the horizontal planes designated by the line 3—3 of Figure 4.

Figure 4 is a partial cross-sectional view of the embodiment shown in Figure 3, taken along the vertical plane designated by the line 4—4 of Figure 3.

Figure 5 is a vertical cross-sectional view of a second embodiment of the apparatus of our invention.

Figure 6 is a plan view of the apparatus of Figure 5.

Figure 7 is a plan view of a third embodiment of our invention, with motor and motor support removed.

Figure 8 is a cross-sectional view of the embodiment shown in Figure 7, taken along the vertical plane designated by the line 8—8 of Figure 7.

Figure 9 is a partial plan view of a modification of the apparatus shown in Figures 7 and 8.

Figure 10 is a partial cross-sectional view of the modification shown in Figure 9, taken along the vertical plane designated by the line 10—10 of Figure 9.

Figure 1:
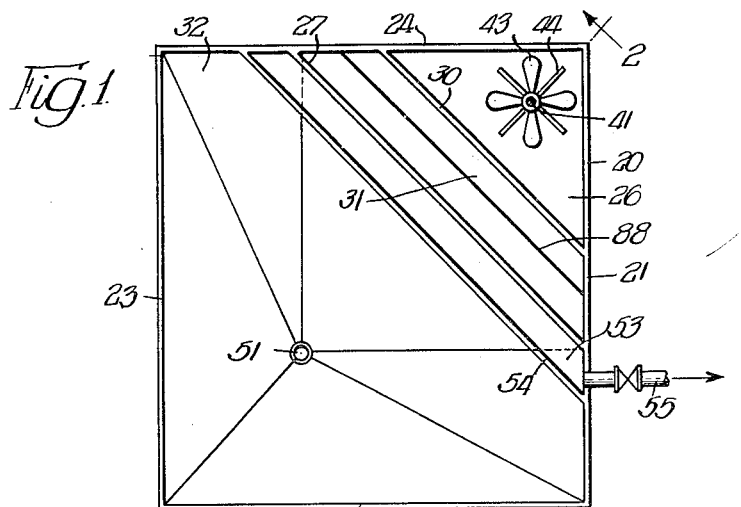
Figure 1 is a plan view of one embodiment of our invention, with motor and motor support removed.
Figure 2:
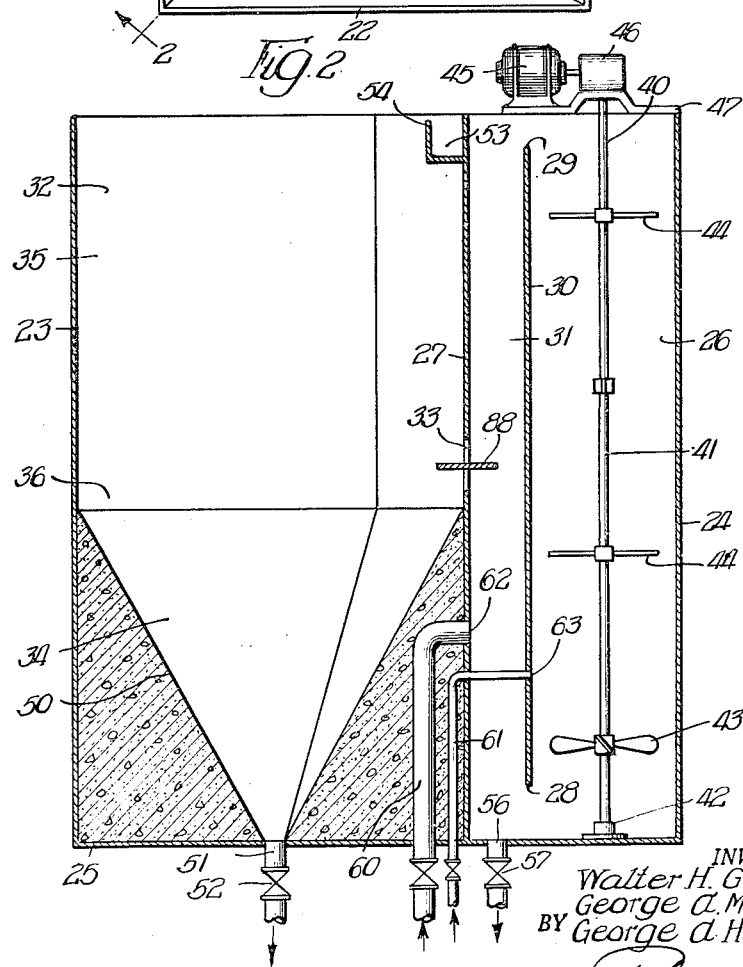
Figure 2 is a cross-sectional view of the embodiment shown in Figure 1, taken along the vertical diagonal plane designated by the line 2—2 of Figure 1.

One of the preferred embodiments of our invention is shown in Figures 1 and 2. The apparatus comprises a basin, or tank, 20 shown in the drawings as square, but which may be of any desired shape or size. The tank is defined by the vertical sidewalls 21, 22, 23 and 24 and the bottom 25. A relatively small dilution and reaction chamber, or zone, is provided within the tank 20, as by placing a dividing wall or partition 27, across the corner formed by the intersection of two sidewalls, such as 24 and 21. The partition 27 should extend from the bottom 25 of the tank to above the liquid level therein, so as to provide an impervious partition or wall between the dilution and reaction zone and the balance of the tank, which latter is functionally divided into an intermediate classification space, a lower thickening space and an upper barren solvent space, but which for the sake of brevity we may call the solids removal chamber, or clarification zone, 32. A baffle, or diaphragm, or second partition, 30 is placed in the dilution and reaction zone to divide it into a precipitation space 26 and a return flow space 31. The lower end 28 of the diaphragm 30 should be spaced above the floor 25 or if the partition should extend to the floor it must be provided with suitable inlet spaces, not shown. Likewise, the upper end terminates, as at 29, below the liquid level within the tank. The preferred construction of the diaphragm or baffle 30 thus divides the dilution and reaction zone into two parts: the precipitation chamber, or space, 26 and the return flow chamber, or space 31 which communicate with each other at the top and bottom of the diaphragm so as to provide a cyclic path for a continuous vertical circulation of liquid through the two, whereby liquid emerging from one end of the precipitating zone is returned to the other end.

The dividing wall 27 is provided with a flow opening or openings 33 situated at a central elevation of the tank. These flow openings may be of any desired size or shape, but are shown in Figure 2 as a continuous slot. A deflecting baffle 88 is placed in the flow opening 33 whereby a predetermined portion of the downward flow through the return flow chamber 31 is deflected outwardly into and across the solids removal chamber 32 of the tank and returned below the baffle to the return flow chamber 31 from the solids removal chamber 32.

The construction above described divides the tank 20 into two chambers, or zones, both of which are sub-divided into spaces, or sub-zones: the dilution and reaction zone, or chamber, on one side of the dividing wall, or first partition 27, which is sub-divided by the second partition, or diaphragm, 30 into a precipitate formation space 26 and a return flow passage 31; and on the other side of the partition a combined classification, thickening and clarified liquid chamber 32 which is divided functionally (as will be better understood hereafter), but not necessarily physically, into settling and thickening space 34 in the lower part thereof, a barren or clarified solvent space 35 in the upper part thereof, and a classification space 36 between the two. The precipitation zone 26 and the return flow passage 31 communicate at both the top 29 and the bottom 28 of the baffle 30 as previously mentioned; and the flow space 31 and the solids removal chamber 32 communicate through flow opening 33.

In the construction shown, the flow is upward in the precipitate formation chamber 26 and downward in the flow chamber 31 although the flow could be reversed if desired. It is contemplating that a portion of the liquid passing downward in the return flow zone 31 will pass out into and across the solids removal chamber 32 through the upper part of the flow opening 33; that the heavier solids and some clarified or barren liquid will separate from the flow across that chamber; and that a portion of the liquid flowing out through the opening 33 and a portion of the solids contained therein will return to the return flow zone 31 through the lower part of the slot 33.

An agitating and liquid impelling means 40 is placed within the dilution and reaction chamber. In the construction shown in all the figures the agitating and impelling means 40 comprises a shaft 41 placed vertically in the precipitation chamber 26 and journaled in suitable bearings, such as 42. Upon the shaft 41 are mounted agitating liquid impelling means such as a propeller 43 and agitators, such as agitating bars 44. The shaft 41 is driven by any suitable means such as an electric motor 45 through a suitable speed reducer 46, both of which are supported above the tank 20 by any suitable means, such as beams 47.

We prefer that the solids removal chamber 32 be provided with a steeply sloping hopper bottom 50 so that solids settling from the intermediate classification space 36 will slide down and become thickened in so doing, and then be readily withdrawn by any suitable means such as a sludge outlet 51 provided with a regulating valve 52. We provide in the upper part of the clarification zone 32 a suitable launder 53 the weir edge 54 of which establishes the level of liquid in the tank. A valved outlet conduit 55 leads from the launder 53. We also provide a drain 56 provided with a flow control valve 57 so that the entire apparatus may be drained if desired.

Solution to be reacted is introduced through an inlet conduit 60 and the reactant solution is introduced through a second inlet conduit 61. We have found that best results are secured when the two reacting solutions are introduced into separate portions of the flow through the dilution and reaction chamber caused by the impeller 40. Thus in Figures 1 and 2 we have shown the first inlet 60 (which may be used for introducing brine in the case of preparation of magnesium hydroxide, or raw sugar juice in the purification of sugar juice) as discharging, as at 62, into the return flow space 31 and the other inlet 61 (which in the case of preparation of magnesium hydroxide, or sugar juice purification, would be the inlet for the reacting chemical) as discharging, as at 63 into the precipitate formation space 26 just above the propeller 43. Equally satisfactory results are usually secured when the inlets are reversed and the chemical inlet 61 discharges into the flow space 31 as shown in Figure 7. In some solutions equally satisfactory results may be secured by introducing the two liquids at the same point in the circulation or even in introducing the two solutions through a common conduit; however, in most instances greatly improved results are secured by first thoroughly mixing one of the solutions with the diluting liquid, which in our invention is the return flow of liquid undergoing treatment, and subsequently adding the second liquid.

During operation of the apparatus, one of the solutions, as the one entering through the first inlet conduit 60 will be diluted by the solution passing downwardly in the flow space 31 and the two will be thoroughly mixed and passed upwardly through the precipitate forming space 26 by the action of the propeller 43. The reactant solution entering through inlet pipe 61 will then be thoroughly mixed with the diluted solution. The reaction between the two solutions will be quite rapid as compared to the usual reactions with dilute solutions, due to the turbulent mixing caused by the propeller 43 although the reaction is not of the same nature as that between strong or concentrated solutions. After reaching the upper end of the mixing, or precipitation, zone 26 the mixture will flow downwardly in the flow space 31. Some predetermined portion of the downflowing mixture will be deflected by the baffle 88 (which may be of any suitable size and shape and may or may not extend the entire length of the opening 33) into the solids removal chamber 32. The apparatus is so designed and constructed that the reaction will be substantially complete by the time the mixture passing downwardly through the return flow space 31 reaches the flow opening 33. The heavier solids formed in the reaction will sediment or deposit from the liquid in the solids removal chamber 32, being collected in the lower or thickening space 34 and withdrawn as desired through sludge outlet 51. A portion of the liquid with the lighter solids flowing outwardly through the flow opening 33 is returned from the solids removal chamber 32 through the lower portion of the flow opening 33 into the lower portion of the return flow chamber 31 and is intermingled with the liquid passing directly down the return flow chamber 31, the mixed liquid being used for the liquid for dilution of newly entering solutions, and the solids to furnish surfaces for the depositing of newly formed precipitate.

Barren, and more or less clarified, solvent will rise in the upper portion of the solids removal chamber 32 through clarified liquid space 35 and will be withdrawn through launder 53.

It will be seen that functionally the classification chamber 32 is divided into three spaces or zones: upper clarified liquid space 35, lower solids thickening space 34, and an intermediate space 36 where heavier solids first begin to separate from the liquid.

In the embodiment shown in Figures 1 and 2 a large portion of the mixture passing through the return flow space 31 will continue its passage through such space while a second portion will pass through the opening 33 into the solids removal space 32. The second portion, or flow diverted from the major circulation, can be set at any desired value by proportioning the sizes of the baffle and passageway, although, as indicated above, it will be considerably in excess of the inflow of liquid to be treated. We have found that in apparatus of this type, using the amount of agitation which we desire, there will be some degree of classification in the return flow zone of the particles formed by the reaction, and that there is some tendency for the heavier ones to pass with the diverted portion of liquid into the solids removal chamber 32 while the finer particles remain in the portion which continues its flow in the return flow chamber 31.

During the preliminary period of operation some portion of the solids carried by the liquid through flow opening 33 will deposit in the thickening space 34 without any material classification thereof. However, after a time the thickening space 34 will become filled with thickening solids, which will be relatively thick at the bottom and quite thin toward the top. After this stage is reached only the heavier particles settle in the thickening space 34. There will be a return of liquid carrying lighter particles of precipitate from the thickening space 34 back into the lower portion of the return flow space 31, where it rejoins the circulation back into the mixing zone. An output quantity of liquid rises to launder 53 and becomes clarified in so doing. After the preliminary stage of operation it is apparent that the heavier solids contained in the mixture flowing outwardly through the flow opening 33 and across the clarification zone 32 will be deposited in the thickening space 34 and that the finer solids will be returned with the barren solution used for dilution, so that the reaction between the newly entering solutions will take place in the presence of these fine solids whereby newly formed precipitate will be deposited on such solids causing them to grow until sufficiently large to separate from the liquid.

When considered as a process our invention involves the mixing or incorporation of the relatively strong reacting solutions into the diluting liquid, whereby the reaction between the two solutions is controlled to form relatively insoluble particles of suitable size and density. The mixture is agitated and circulated through a confined space for a time sufficient to permit substantial completion of the reaction between the two solutions and the formation of some particles of desired quality. A predetermined flow of the mixture is passed continually across the classification space 36 of the solids removal chamber 32 wherein the larger particles can separate from the liquid and deposit into the thickening space 34 while the finer particles return with the liquid into the mixing zone. In this manner the solutions are diluted with barren, previously treated liquid (solvent) from which the solute has been precipitated but only the heaviest particles have been removed, so that the barren diluting liquid contains smaller suspended particles upon which are formed the new solids precipitated by the reaction of the two solutions. In most reactions it is desirable that the newly entering liquid be diluted with a volume of liquid considerably in excess of its own volume, so that customarily we will circulate a volume of treated liquid many times that of the newly entering solutions. Thus in precipitating magnesium hydrate we have found it well to have the precipitation take place in and from a solution containing a soluble magnesium salt in an amount of the order of about 250 parts per million or less when a coarse particle precipitate is desired. Thus, in treating sea water at one location where the magnesium salt content was about 4600 parts per million, good results were had with dilution of about 25 to one, giving a solution with a soluble magnesium salt content of about 180 parts per million. In another case treating a brine containing about 3.5 per cent magnesium chloride it was found desirable to dilute about 170 times, leaving a solution of magnesium salt of about 205 parts per million. The dilutions indicated above are not closely critical and are to be taken as what we found desirable rather than as necessary to get coarse particles of this material when treating at ordinary temperatures. It is to be noted also that dilution as we practice it, not only has its own desirable effects, but is accompanied by longer retention of both liquid and precipitated solids in the treating zone so that there is greater time and opportunity for both complete precipitation and crystal growth with consequent less loss of material and bettering of product.

In this connection it will be understood that the amount of dilution is dependent primarily on the rate of circulation of the retained treated solution, rather than on the total amount of the treated solution. Thus, more effective dilution is secured by rapidly recirculating a relatively small body of retained solution than in slowly circulating a large body of liquid. We prefer to effect dilution to a point at which the relatively insoluble compound formed in the reaction can exist in a state of supersaturation for a short time, so that the newly formed molecules can remain in solution until they contact a solid particle in the retained previously treated liquid, whereupon they deposit on it. This is in contrast to a reaction of such strong solutions that the compound formed cannot remain as a supersaturated solution and therefore forms solid particles immediately, with the result that a great number of fine particles are formed. Even in the removal of colloidal particles, as in the purification of sugar juice, we find that by proper dilution, as above described, we secure a relatively small number of new particles as most of the precipitate formed deposits on the old particles suspended, or entrained, in the returned previously treated solution. Thus we are able to secure a denser, more readily dewatered precipitate than is secured in the normal liming of sugar juice, and we are able to get a particle growth of the organic impurities, by accretion, similar to particle growth from supersaturated solutions of inorganic salts.

The figure of 250 parts per million is not to be taken as a strict limit for it will be affected by such things as temperature and impurities present, but can be taken as expressing good practice where a coarse grained, easily filterable precipitate is desired. A longer retention of particles in the circulation permits a lesser degree of dilution. A greater dilution tends toward coarser grain. From this it will be seen that from one aspect, what we have found is that such apparatus should be built and should be operated not merely from the standpoint of the quantity of liquid to be treated, as has heretofore been the practice, but from the standpoint of the amount of solids to be formed. In saying this we are referring to the reaction and circulation or treating space primarily for of course it has been customary to provide space sufficient to receive settled solids. It is to be noted also that dilution is had not merely as a matter of size of apparatus but that rate of circulation is also involved and is, up to a point, the more important of the two for it is the volume of diluting liquid passing by the point of entry of the new solution that effects dilution. For this reason we prefer a very rapid circulation through the precipitate formation or mixing zone 26 and the return flow chamber 31.

In connection with our process it should be kept in mind that regulation of the withdrawal of solids is of major importance. Obviously, the nature of the liquid returned to the dilution and reaction chamber affects materially the operation of the process. For this reason we carefully control solids withdrawal to secure a length of retention in the thickening chamber sufficient to secure maximum concentration or thickening of solids and to provide for removal in small amounts in order to prevent withdrawing the circulating liquid or the suspended solids needed in the dilution and reaction chamber. Thus we prefer to withdraw solids in small amounts at frequent intervals such as by an automatic valve operated for a fraction of a minute every five or ten minutes.

Figure 11:
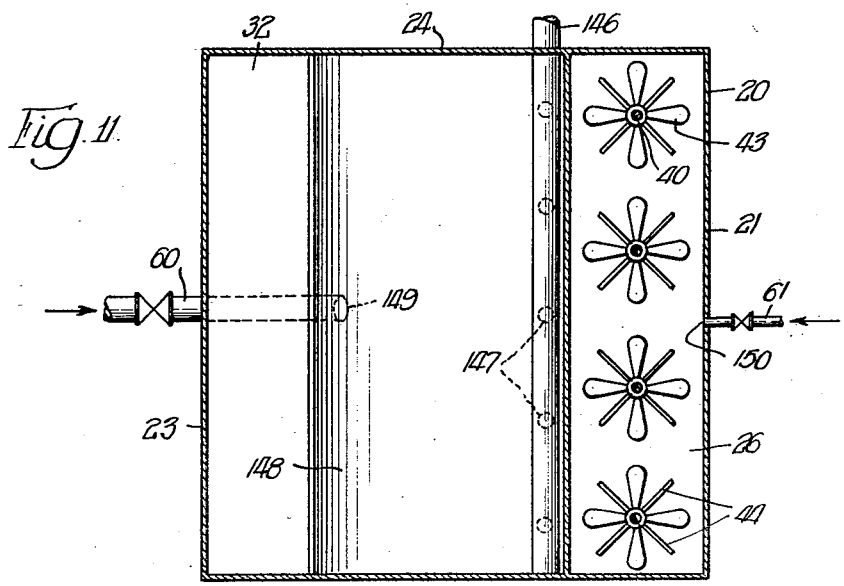
Figure 11 is a plan view of another embodiment of our invention, taken along the horizontal plane designated by the line 11—11 of Figure 12.

The apparatus shown in Figures 3 and 4, discloses a slight modification of that shown in Figures 1 and 2, and is particularly adapted for use in large size tanks. For purposes of illustrating various forms of apparatus only, we have shown the dividing wall, or partition, 68 separating the solids removal chamber 32 from the return flow chamber 31 and the diaphragm, or baffle, 69 separating the return flow chamber 31 from the precipitate forming space 26 as parallel to one tank wall, such as 21. In other respects the mixing zone, agitator, and return flow zone are similar to that of Figures 1 and 2. It will be obvious that if the width of the treating tank is large, the flow into the solids removal chamber 32 from the return flow space 31 will be unable to extend entirely across the width of the solids removal chamber 32. This results in a failure to utilize the outer portion of that space to the fullest extent. To avoid this difficulty we provide, instead of a flow opening 33, as shown in Figures 1 and 2, a plurality of conduits 70 extending from the dividing wall 68 across this solids removal chamber. Preferably the conduits 70 will discharge at a point adjacent the opposite wall 23 of the tank 20. We prefer to use a construction such as shown in Figures 3 and 4 in which the conduits 70 extend from the partition 68 to a discharge casing 71 attached to the opposite wall 23 of the tank 20. The discharge casings 71 are provided with orifices 72 or other suitable flow openings designed to discharge thin streams of liquid substantially along the entire wall 23 of the tank. Preferably such orifices will discharge inwardly or downwardly, as shown. In such a construction it is also necessary to provide a plurality of return flow openings 73 preferably at a level slightly below the outflow conduits 70. In this form the deflecting baffle 88 is located at an elevation between the conduits 70 and the return passageways 73. The liquid discharged by the outflow conduits 70 through the orifices 72 will then flow across the classification space 36 of the solids removal chamber 32 and be returned into the circulating liquid through the return flow openings 73. The operation of the apparatus shown in Figures 3 and 4 is substantially the same as that shown in Figures 1 and 2, the principal difference being in the provision for positive circulation of a predetermined portion of treated liquid across the entire width of the classification space 36. It will be obvious that the size and number of the conduits will depend on the character of the reacting solutions, and the character of the precipitate to be formed. It will also be obvious that the use of a single impeller in the relatively large precipitate forming space 26 will create two vertical circulations; one over and under the diaphragm 69 as described in connection with the description of Figures 1 and 2, and a second entirely within the precipitate forming space 26 moving upwardly above the impeller and returning downwardly at the ends of the space. This double circulation is sometimes desired, but if not, it can be avoided by the use of a plurality of impellers, as shown in Figures 7 and 11.

Figures 5 and 6 illustrate a second embodiment of our invention. In this embodiment the tank 80 is shown as circular, with an upper vertical wall 81 and is preferably provided with a hopper bottom 82. The precipitate forming space 26 is formed by a central inner cylinder 83 and the return flow space 31 by an outer cylinder 84. The two cylinders are supported by any suitable means such as braces 85 and 86, respectively, above the hopper bottom 82. In this type of apparatus the outer cylinder is provided with an impervious bottom 96 so as to confine the circulation caused by the impeller 43 to the two cylinders only and to provide a relatively large space below the dilution and reaction zone for thickening of solids. The construction of the mixing zone 26 differs slightly from that of the previous figures, also, in that the impeller 43 is substantially less than the diameter of the inner cylinder 83 and is located at the lower end of that cylinder. In such an event the cylinder 83 is preferably provided with a collar 99 which is merely a section of diminished diameter surrounding the propeller 43. The embodiment has, also, an annular deflecting baffle 88 which is placed in the flow opening 33 to provide a positive means for causing the flow of a desired volume of circulating liquid into the solids removal chamber 32.

In the apparatus shown in Figures 5 and 6, we prefer to place a scraping mechanism 89 comprising scraper blades 90 mounted on a quill shaft 91, whereby the blades 90 may be slowly rotated. A sludge outlet 92 leads from the lowermost portion of the hopper bottom 82.

In the construction shown in these figures it is possible to locate the motor 93 and reducer 94 below the tank 20 and to drive both the propeller 43 and the sludge scraping mechanism 89 by the same motor. In such a construction it is, of course, desirable to provide a liquid proof gland, not shown, for the shafts where they enter the floor 82 of the tank 80. In this event the reducer 94 must be of a type to provide two separate speeds: a slow one for the quill shaft 91 upon which is mounted the scraper mechanism 89 and a second and faster one to drive the shaft 95 which extends upwardly in the quill shaft 91 and through the floor 96 of the outer cylinder 84 to drive the propeller 43. The drive shaft 95 may be journaled in suitable bearings, such as 97, supported by any suitable means, such as spider 98.

The process is, of course, the same as that involved in the other figures and the operation of the apparatus is substantially the same as that described in connection with the apparatus of Figures 1 and 2. The only difference of importance is the provision for a sludge scraping mechanism 89 in the bottom 82 of the tank 80, whereby settling solids can be thickened during settling, and the settled particles can be positively moved from their place of deposit to the point of removal. It is well known that slow movement of settled solids causes them to thicken, or dewater, by permitting escape of liquid enveloped, or trapped, in the solids. The action of sludge scraper 89 therefore not only moves the sludge to the outlet but also concentrates it in so doing, thus aiding in the process of separating solids from liquid.

Figures 7 and 8 illustrate another major type of structure suitable for the carrying out of our process. The apparatus comprises a reaction basin 20 which is provided with an overflow launder 53 and an outlet conduit 55 as in the other figures. In this type of construction the dilution and reaction chamber (formed by the dividing wall 68, the wall 21, and parts of the adjacent walls) and the diaphragm 69 and deflecting baffle 88 may be the same as shown in Figures 3 and 4 and need not be described. The only difference of importance is the modification of the system of outflow of the liquid from the reaction chamber 31 to the classification chamber 32 and its return to the dilution chamber. In this embodiment we provide a number of short partitions 105, 106, 107, 108, 109, and 110 in the solids removal chamber 32 extending from the partition 68 to the opposite wall 23 of the tank and extending from the floor 25 upwardly to a central level adjacent a plurality of outflow openings 112, 113, 114 and 115 which are located between alternate pairs of these partitions, such as between wall 24 and partition 105, and between the partitions 106 and 107, and the like. The return flow openings 116, 117 and 118 are located between the alternating pair of partitions, such as between partitions 105 and 106, and the like, and are preferably located at the bottom of the tank. This construction provides series of thickening chambers 119, 120, 121 and 122 alternating with return passageways 123, 124 and 125 in the solids removal chamber 32. The thickening chambers 119, etc., are thus underneath the outflow openings, and are used for the thickening of solids, and the alternating, or return flow passageways 123, etc., are used to return liquid with suspended lighter solids to the lower portion of the flow chamber 31 so that it may be picked up and returned to the inner precipitate forming chamber 26 for dilution of the reacting solutions. As shown in Figures 7 and 8 it is preferred that the thickening chambers 119, 120, 121 and 122 be considerably larger than the return chambers 123, 124 and 125. In this type of construction it is necessary to provide each thickening chamber 119, 120, 121 and 122 with a sludge outlet 126 each of which is provided with a regulating valve 127.

The operation of this type of apparatus is substantially the same as of that shown in Figures 1 and 2. A predetermined portion of the reacted liquids flowing through the return flow space 31 will pass through the flow openings 112, etc., over the lower thickening chambers 119, etc., and be withdrawn over the upper edge of the baffles, such as 105, etc., into the return chambers 123, etc., from which it passes into the lower portion of the flow space 31. A portion of the flow in flow space 31 will, of course, continue down this space and one of the reacting solutions can be introduced into such flow, as shown in Figure 7. As will be noted in Figure 7, it is possible to provide a plurality of propellers 43 in the mixing zone 26 if necessary to secure the desired circulation. Obviously they can all be driven by a single motor if desired.

Figures 9 and 10 illustrate a modification of the apparatus shown in Figures 7 and 8. In this modification the outflow openings 112, 113, 114 and 115 are replaced by conduits 135 extending outwardly from the dividing wall 68 towards the opposite wall 23 of the tank. These conduits are provided with a plurality of laterally opening orifices 136 so that liquid passing into the conduits 135 is discharged across the entire width of the classification space 36. This prevents short-circuiting of the flow when used in large size apparatus. The reacted liquid is thus discharged across the entire width of the classification space, over the lower thickening chambers 119, 120, 121 and 122 and flows horizontally from the conduits 135 over to the adjacent partition, such as 108 and 109, etc., and after passing over the partitions flows into the return flow chambers, such as 124 or 125, etc., and is thus returned to the mixing or reaction zone.

Figure 12:
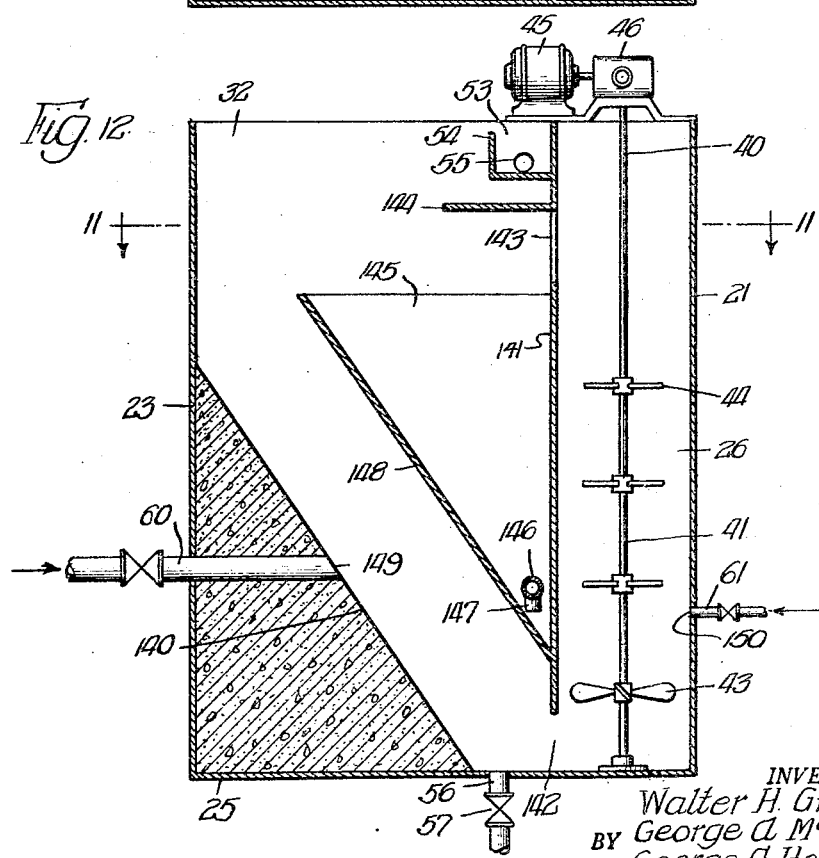
Figure 12 is a vertical cross-sectional view of the embodiment shown in Figure 11.

The apparatus shown in Figures 11 and 12 illustrates a fourth embodiment of the apparatus of our invention. In this type of construction the tank 20 may be of any suitable size or shape, although we show a square one, and preferably is provided with a modified hopper bottom 140. The tank is provided with an overflow launder 53 and with an agitator or propelling mechanism 40 such as shown in the other figures. However, in this type of construction we need only one partition or baffle 141.

This partition is spaced above the floor of the tank 25 so as to provide a passageway 142 at the floor of the tank between the two chambers formed in the tank by the partition. Another passageway 143 is provided in the partition slightly below the top thereof. The partition thus divides the tank into a dilution and reaction chamber, which is similar to the precipitate forming space 26 of the other figures, and a classification chamber 32 which communicate with each other at the top and bottom so that there may be a vertical circulation through the dilution and reaction chamber, through the upper passageway 143 out into the solids removal chamber 32 and returning to the mixing chamber through the lower passageway 142. Above the upper lip of the upper passageway 143 is placed a deflecting baffle 144 which will direct the flow issuing from the mixing zone horizontally and prevent such flow from agitating the liquid in the upper portion, or clarified solvent space 35 of the classification chamber 32. Immediately below the lower lip of the upper passageway 143 is a solids collecting chamber 145 which may take the form of a single trough as shown in these figures, or may take the form of a plurality of individual pockets. The solids collecting chamber 145 is provided with a suitable sludge outlet, such as conduit 146, which is shown with a plurality of sludge pick-up orifices 147. The pocket or trough 145 should be provided with sloping walls 148 such as shown in Figure 12, whereby solids deposited in the trough can be passed by gravity to the sludge outlets. The inlet for one of the solutions, such as the main inlet conduit 60 can discharge into the lower portion of the tank, as at 149, while the other can discharge into the dilution and reacting zone, as at 150.

In this type of apparatus one of the solutions is mixed with, and diluted by, reacted liquid containing finer suspended solids which are not deposited during the passage over the concentrating compartment 145. This mixture is drawn into the lower end of the mixing zone through the lower passageway 142 and is drawn upwardly by the propeller 43. The mixture of solution and reacted liquid then meets the other solution, and the two react to cause formation of solid particles. The precipitate formation space 26 should be of such size and provide sufficient mixing to permit substantial completion of the reaction between the two solutions by the time they reach the upper passageway 143. The deflecting baffle 144 deflects upward flow of liquid horizontally so that it passes directly over the solids collecting chamber 145. The heavier solids will deposit from the horizontal flow into the solids collection compartment 145 while the finer solids will not have a chance to so settle and will thereupon be taken with treated liquid across the upper face of the solids collecting compartment 145 and will be drawn downwardly in the classification chamber of the tank to the lower end of the mixing zone, so that they can be used for seeding the incoming solution. We have found that in this type of structure a small amount of clarified liquid will rise from the horizontally flowing stream as it passes over the solids collecting chamber. This liquid does not require a large clarification space, although we do prefer to provide a short rising space before the liquid is withdrawn.

It will be evident that the size of the apparatus of our invention will depend upon the quantity and type of liquid to be treated, or on the quantity or nature of the solids formed by the reaction of the solutions, or both. However, in view of the fact that the turbulent agitation and circulation of the solutions provide for the rapid and thorough mixing of the two, and also due to the fact that the solutions are very greatly diluted with the reacted liquid, and that the diluting liquid contains seed particles from previously treated solutions, the reaction is completed very rapidly with the formation of a smaller number of relatively large and dense particles. As it is desired to remove only the heavier and denser particles, no extensive clarification space is required. In our process the heavier particles only are removed and the major portion of the liquid with the finer suspended particles is returned for diluting the newly entering solution.

It should be understood that the term "dilution" is used in the specification and claims in the sense of mixing the solution to be treated with solvent which contains a substantially lesser amount of the solute to be precipitated than does the solution to be treated, whereby the concentration of that solute in the resultant solution is substantially reduced. The diluting solvent may, therefore, be a very concentrated solution of some other solute, and will of course contain suspended finer particles of the relatively insoluble compound precipitated by the reaction. For example, in the precipitation of magnesium hydroxide by the reaction of lime with a brine containing magnesium chloride, the reacted liquid which is used as a diluent for incoming brine is water containing substantial amounts of other salts, such as calcium chloride, but is quite barren of magnesium or hydroxide ions. In the same sense, "barren solvent" may contain as much total dissolved solids as in incoming solution to be treated but will be substantially barren of the solute desired to be precipitated.

Manifestly many modifications and variations of the invention hereinbefore set forth may be made by persons skilled in the art without departing from the spirit and scope thereof. Accordingly the types of apparatus shown in the drawings included herewith are for purposes of illustration only and our invention is not to be limited to such structures.

We claim:

1. In the formation of a relatively insoluble precipitate from chemical solutions of such strength that conditions are unfavorable for the precipitation of particles of coarse size, the process which comprises the steps of retaining in the treating system a volume of already treated solution in amount bearing a predetermined ratio to the rate of entry of new solution, maintaining a circulation of said retained solution through a confined cyclic path, delivering new solution into the circulating solution at one point in its path and precipitating reagent at another point thereof, said points being so spaced apart that at least one of the introduced materials will be mixed with and diluted by the already treated solution before contacting and reacting with the other material, continuously diverting from the circulating solution a flow thereof substantially in excess of the rate of entry of new solution and passing said diverted flow laterally across a central elevation of a clarification compartment at a velocity sufficiently low to permit larger and heavier particles formed as a result of the precipitating action to deposit therefrom and sufficiently high to retain smaller and lighter particles in suspension, withdrawing said heavier and larger particles from below said diverted flow, withdrawing a portion of said flow as clarified barren solvent from above said diverted flow and discharging such portion to disposal, and returning the remaining part of said diverted flow, after passing laterally across said central elevation of said clarification compartment and carrying smaller and lighter particles, into the circulating flow whereby the returned liquid again acts as diluent and the smaller and lighter particles grow.

2. In the precipitation of relatively insoluble solids from a solution the improved process that comprises retaining in a dilution and reaction zone a volume of barren already treated solution, flowing a stream of unreacted solution into the barren solution in said zone, the ratio between barren solution and unreacted solution being such as to effect a dilution of the unreacted solution entering the treating zone to a predetermined solute content of from about 150 to about 300 parts per million, mixing a precipitating reagent with the diluted solution, maintaining the contents of the dilution and reaction zone in circulation adequate to obtain the desired dilution, to effect mixing of solution and reagent and to retain in suspension the solid particles present, continuously directing a flow of the treated solution in amount substantially exceeding the rate of inflow of solution to be treated laterally across a central elevation of a classification chamber, allowing heavier particles to deposit from the flow of solution across the classification chamber into an underlying thickening space, withdrawing clarified barren solution from said flow across the classification chamber into an overlying clarified liquid space at a rate corresponding to the rate of entry of new solution, returning the balance of the solution with contained lighter particles from adjacent said central elevation of said classification chamber and without appreciable thickening of solids therein into the dilution and reaction zone, whereby the returned solution may further act as diluent and the particles be subject to further growth, and withdrawing solids from the thickening space.

3. In the treatment of a strong solution to obtain relatively insoluble precipitate therefrom in coarse particle form, the process which comprises the steps of retaining in the treating system a large volume of already treated and barren solvent and entrained precipitate, maintaining a circulation of said retained solvent and precipitate through a predominantly vertical cyclic path, mixing new solution and a precipitating reagent in a larger volume of said circulating solvent, and passing the resultant mixture through a reaction space in said cyclic circulation for a length of time sufficient to permit substantial completion of reaction between said solution, reagent, and retained precipitate, continuously passing a stream of said reacted solution in amount substantially exceeding the rate of inflow of new solution and less than the circulation of said reacted solution laterally across a central elevation of a clarification compartment at a velocity adapted to permit deposit of heavier precipitate only from said stream, sedimenting said heavier precipitate in said stream into an underlying thickening space and withdrawing sedimented solids from said thickening space, displacing an amount of clarified solvent from the stream equivalent to the entering new solution into an overlying clarified solvent zone, withdrawing clarified solvent from the upper part of said clarified solvent zone, and returning the major portion of said stream carrying the lighter precipitate in suspension from adjacent said central elevation to said reaction space to act as diluent therein.

4. A process for the treatment of strong chemical solutions to precipitate relatively insoluble substances therefrom comprising the steps of continuously feeding solution to be treated into, and diluting same with, a substantially larger volume of a vertically circulating body of barren previously treated solution in a precipitation zone, introducing a precipitate causing reagent into the so diluted solution, retaining the treated solution in the circulating body for a period sufficient to substantially complete the chemical action involved and the formation of the resultant precipitate, retaining precipitate in suspension in the circulating body of solution to effect building up of the particles thereof by further precipate, continuously circulating a portion only of such solution horizontally out from said precipitation zone across a central elevation of a classification zone, such portion being substantially in excess of the feed of solution to be treated, withdrawing clarified solvent upwardly from said central elevation into an upper portion of the classification zone to disposal, permitting heavier particles to deposit from the solution crossing said classification zone into a lower thickening zone, withdrawing solids from the lower part of said thickening zone and thence to disposal, and returning the solution remaining after passing horizontally across said central elevation of said classification compartment to said circulating body of solution, said returned portion carrying lighter solids without appreciable thickening from said central elevation of said classification zone into said circulating body for further building up of the lighter solids contained in such returned solution.

5. A process for the treatment of strong solutions to obtain relatively insoluble precipitate therefrom in coarse particle form, which comprises the steps of retaining in the treating system a large body of barren previously treated solvent and entrained precipitate, maintaining said solvent in a state of circulation through a cyclic path of recirculation embracing the major portion of the body of solvent in said system, said cyclic path containing a reaction space of sufficient length to permit substantial completion of the reactions involved and a horizontally extending classification space, separately disseminating new solution and a precipitating reagent in said circulating solvent in said reaction space, then passing an amount of reacted solution substantially in excess of the inflow of new solution horizontally across a central elevation of the horizontal classification space at a velocity adapted to permit the deposit of heavier precipitate only, removing said heavier precipitate from below said central elevation, withdrawing to disposal an output portion of clarified solvent from said central elevation, and returning the major portion of said solvent and entrained lighter precipitate in said circulation from said central elevation to said reaction space for use as a diluent to newly entering solution.

6. In the precipitation of a relatively insoluble magnesium compound from a brine containing a dissolved magnesium salt in such concentration that conditions are unfavorable for the precipitation of dense particles, the improvement that resides in continuously flowing new brine into a reaction chamber and there incorporating the same in a relatively large volume of retained previously treated brine barren in regard to magnesium salt to effect dilution of said brine to a predetermined magnesium ion content, similarly introducing and incorporating into said retained solution in said reaction chamber a precipitating reagent whereby precipitation will occur under conditions of relatively dilute solution, maintaining the volume of retained brine in continuous circulation through a predetermined cyclic path, continuously diverting from the flow of the circulating brine at one point of said path a stream having a volume substantially less than the flow of said circulating brine and substantially more than the flow of new brine horizontally across a central elevation of a classification compartment at a velocity adapted to permit sedimentation of heavier particles only from said flow, sedimenting heavier particles from the diverted stream, withdrawing to use the separated heavier particles, withdrawing a clarified part of the diverted stream equivalent to the entering brine upwardly from said central elevation into an overlying clarified water zone and from said clarified water zone to waste, and returning the balance of the diverted stream containing lighter particles from adjacent said central elevation to the reaction chamber without substantial thickening of the solids in the returned portion.

7. The process of claim 6 wherein the ratio of previously treated brine to newly entering brine is such as to provide a concentration of magnesium salt of the order of from about 150 to about 300 parts per million.

8. In the precipitation of relatively insoluble impurities from a sugar juice the process that comprises flowing a stream of entering juice into a reaction chamber and there dispersing the same into a relatively large volume of retained previously treated juice to effect dilution of said juice to a predetermined solute content, subjecting the diluted juice to the action of a precipitating reagent in said reaction chamber, maintaining the diluted juice in a continuous agitated vertical circulation sufficient to maintain the desired dilution, to effect mixing of juice and reagent and to retain in suspension the solid particles present, continuously passing a flow of treated juice in amount substantially exceeding the rate of inflow of juice to be treated and substantially less than the flow of said circulating juice horizontally across a central elevation of a classification chamber, allowing heavier particles to deposit from the flow of juice in the classification chamber into a thickening zone and thence passing such particles to waste, withdrawing clarified juice upwardly from said central elevation at a rate corresponding to the rate of entry of new juice into a body of clarified juice and thence to use, returning the balance of the juice with contained lighter particles from adjacent said central elevation to the reaction chamber for admixture with entering juice, whereby the solution may further act as diluent and the particles be subject to further growth.

9. Apparatus for effecting chemical reaction and precipitate formation in the treatment of solutions comprising a tank, a vertically extending dividing wall in said tank dividing the same into a first chamber and a second chamber, means including a power driven liquid impeller in said first chamber positioned to circulate liquid through said chamber, a passageway between said first and second chamber at a central level thereof, a flow directing means associated with said passageway and so constructed and arranged as to divert a predetermined portion of the liquid circulated through said first chamber laterally across said second chamber at said central level, a second passageway for returning a major part of said diverted portion from said second chamber to said first chamber, a solution inlet and a reagent inlet opening into said first chamber, an outlet from the upper part of said second chamber, and a second outlet from a lower part of said second chamber.

10. The apparatus of claim 9 wherein said flow directing means is a substantially horizontal deflecting baffle positioned at a level intermediate said first and second passageways.

11. The apparatus of claim 9 wherein the first passageway between said first and second chambers comprises flow conduits extending horizontally into said second chamber from said partition and orifices in said conduits.

12. Apparatus for effecting precipitation of substantially insoluble particles of coarse size from chemical solutions of such strength as to be unfavorable for precipitation of particles of coarse size which comprises a basin, a dividing wall in said basin dividing the same into a dilution and reaction chamber and a laterally adjacent solids removal chamber, a partition in said dilution and reaction chamber so constructed and arranged as to establish a path for cyclic circulation in said chamber embracing substantially the entire volume of said chamber, mechanical propulsion means in said dilution and reaction chamber adapted to cause a circulation of liquid through said path, a prime mover to operate said propulsion means, inlets opening into said dilution and reaction chamber, a constantly open passageway from said dilution and reaction chamber into said solids removal chamber at a central elevation thereof and a return passageway from a level in said solids removal chamber adjacent the level of said first mentioned passageway and leading to said dilution and reaction chamber, a flow restricting member in said dilution and reaction chamber adjacent to and located at a level between said passageways, a liquid outlet from the upper portion of said solids removal chamber, and a solids outlet from a lower portion of said solids removal chamber.

13. In apparatus for the treatment of a strong solution to effect precipitation of a solute in desired particle form, a dilution and reaction chamber and a laterally adjacent solids removal chamber, a shaft extending within said dilution and reaction chamber, a liquid moving member mounted on said shaft, a partition within said dilution and reaction chamber so constructed and arranged as to provide a path for cyclic circulation within said chamber, a solution inlet and a reagent inlet opening into the dilution and reaction chamber, passageways between the dilution and reaction chamber and a central elevation of the solids removal chamber, a flow restricting baffle in said dilution and reaction chamber between said passageways, a liquid outlet from the upper part of said solids removal chamber, and a solids outlet from a lower part of said solids removal chamber.

14. An apparatus for the reaction of strong solutions to effect precipitation of a solute therefrom in coarse particle form comprising a tank, a dividing wall in said tank extending from top to bottom thereof and dividing the tank into a dilution and reaction chamber and a solids removal chamber, a partition within said mixing and reaction chamber so constructed and arranged as to provide a path for cyclic circulation in said chamber, a mechanically driven stream projecting impeller within said mixing and reaction chamber adapted to cause a turbulent and rapid flow through said path of circulation, a solution inlet and a reagent inlet opening into said dilution and reaction chamber, a plurality of flow conduits communicating with said dilution and reaction chamber and extending substantially horizontally from said dividing wall into said solids removal chamber at a central elevation therein, flow orifices in said conduits, flow openings in said dividing wall adjacent the level of said conduits, a flow restricting member in said mixing and reaction chamber intermediate said conduits and said flow openings, an outlet from the upper part of said solids removal chamber, and a second outlet from the space adjacent the bottom of said solids removal chamber.

15. In apparatus of the type described, the combination of a cylindrical tank, a cylindrical partition centrally disposed in the upper portion of said tank and spaced above the bottom thereof, a bottom in the lower end of said cylidrical partition, a second and shorter cylindrical partition axially disposed within said first partition, a mechanically driven stream projecting impeller axially disposed in the space enclosed by said second cylindrical partition and so constructed and arranged as to cause a turbulent flow of liquid through said space, a passageway through the first mentioned partition at a central elevation in said tank, a horizontally extending baffle in said passageway and extending into the space enclosed by said first partition, a solution inlet and a reagent inlet opening into the space enclosed by said first partition, an outlet from the space in the upper part of the tank outside said partition, a second outlet in the bottom of said tank, and a scraping means adjacent the bottom of said tank adapted to move solids depositing on the floor of the tank to the second outlet.

16. An apparatus for the treatment of a strong solution comprising a basin, a wall structure within said basin dividing the same into a dilution and reaction chamber and a solids removal chamber, a partition in the dilution and reaction chamber so constructed and arranged as to provide parallel vertical passageways for the circulation of liquid in said dilution chamber, a propeller in one of said vertical passageways, means including a shaft for driving said propeller, a solution inlet and a reagent inlet opening into the dilution and reaction chamber, a plurality of partitions in the solids removal chamber extending from the dividing wall to a wall of said basin and from the floor thereof to a central elevation of said solids removal chamber, passageways from said dilution and reaction chamber opening into said solids removal chamber between alternate partitions and located at a level adjacent the upper edge of said partitions, flow passages into said dilution and reaction chamber from said solids removal chamber between the other alternate partitions and located at a level adjacent the bottom of said partitions, a flow restricting member in said dilution and reaction chamber between said passageways and said flow passages, an outlet from the upper part of the solids removal chamber, and outlets from the spaces between said partitions in said solids removal chamber underneath said passageways from said dilution and reaction chamber.

17. The apparatus of claim 16 wherein the passageways from the dilution and reaction chamber comprise conduits extending horizontally from said wall structure into said solids removal chamber and a plurality of orifices in said conduits.

18. An apparatus for the treatment of a strong solution comprising a vertical tank, a dividing wall in said tank dividing the tank into two horizontally adjacent chambers, and so constructed and arranged as to provide at least two communications between said chambers, a lower one adjacent the bottom of said tank and an upper one at a central elevation thereof, a mechanically driven stream projecting impeller in the first of said chambers, a solids thickening compartment in the second of said chambers beneath the upper communication and above the lower communication, an outlet from the lower part of said solids thickening compartment, inlet means for delivering solution to be treated and a precipitating reagent into said first chamber, and outlet means from the upper portion of said second chamber.

19. In apparatus of the type described comprising a tank, a partition in said tank dividing the same into a reaction chamber and a laterally adjacent combined solids classification and removal chamber, a power driven liquid impeller in said reaction chamber positioned to circulate liquid through said reaction chamber, a solution inlet and a reagent inlet opening into said tank and so positioned as to deliver solution and reagent into the reaction chamber, an outlet from the upper part of said solids classification and removal chamber, and a second outlet from the lower part of said solids classification and removal chamber: means for diverting a portion only of the flow in said reaction chamber horizontally across the solids classification and removal chamber at a central elevation thereof and for returning a major part of such diverted portion from adjacent said central level to said reaction chamber, said means comprising an open passageway between the chambers through said partition at a central level thereof and a flow controlling baffle associated with said passageway.

20. In apparatus of the type described a tank, a partition in said tank dividing the same into a reaction chamber and a combined solids classification and removal chamber, an open passageway between the two chambers through said partition at a central level thereof, a second open passageway between the two chambers leading from a level in said solids classification and removal chamber adjacent said first passageway, a flow diverting member so constructed and arranged as to divert a portion of the liquid which may be circulated in the reaction chamber horizontally across said solids classification and removal chamber at said central elevation and to return liquid from said latter chamber into said reaction chamber through said second passageway, a power driven liquid impeller in said reaction chamber positioned to circulate liquid therethrough, separate solution and reagent inlets into said tank and so positioned as to deliver solution and reagent into the reaction chamber, an outlet from the upper part of said combined solids classification and removal chamber, and a second outlet from the lower part of said combined classification and removal chamber.

WALTER H. GREEN.
GEORGE A. McBRIDE.
GEORGE A. HERTZING.

No references cited.

Certificate of Correction

Patent No. 2,458,261.  January 4, 1949.

WALTER H. GREEN ET AL.

It is hereby certified that errors appear in the printed specification of the above numbered patent requiring correction as follows:

Column 3, line 34, for the word "bring" read *brine*; column 4, line 51, for "collodial" read *colloidal*; column 7, line 2, for "preceipitation" read *precipitation*; line 57, for the word "plating" read *plated*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*